(12) United States Patent
Shu et al.

(10) Patent No.: US 10,372,337 B2
(45) Date of Patent: Aug. 6, 2019

(54) WRITE REQUEST PROCESSING METHOD AND MEMORY CONTROLLER

(71) Applicant: Huawei Technologies Co., Ltd., Shenzhen (CN)

(72) Inventors: Jiwu Shu, Beijing (CN); Long Sun, Beijing (CN); Yuangang Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 59 days.

(21) Appl. No.: 15/809,447

(22) Filed: Nov. 10, 2017

(65) Prior Publication Data
US 2018/0088827 A1    Mar. 29, 2018

Related U.S. Application Data

(63) Continuation of application No. PCT/CN2016/074044, filed on Feb. 18, 2016.

(30) Foreign Application Priority Data

May 13, 2015  (CN) .......................... 2015 1 0242597

(51) Int. Cl.
| | |
|---|---|
| *G06F 3/06* | (2006.01) |
| *G06F 9/46* | (2006.01) |
| *G06F 9/52* | (2006.01) |

(52) U.S. Cl.
CPC ............ *G06F 3/0608* (2013.01); *G06F 3/065* (2013.01); *G06F 3/0641* (2013.01); *G06F 3/0688* (2013.01); *G06F 9/46* (2013.01); *G06F 9/466* (2013.01); *G06F 9/52* (2013.01)

(58) Field of Classification Search
CPC .... G06F 3/0608; G06F 3/0641; G06F 3/0688; G06F 3/065; G06F 9/46; G06F 9/52; G06F 9/466
See application file for complete search history.

(56) References Cited

U.S. PATENT DOCUMENTS

| | | |
|---|---|---|
| 8,364,911 B2 | 1/2013 | Shpeisman et al. |
| 2006/0190510 A1 | 8/2006 | Gabryjelski et al. |
| 2007/0203960 A1 | 8/2007 | Guo |

(Continued)

FOREIGN PATENT DOCUMENTS

| | | |
|---|---|---|
| CN | 101046755 A | 10/2007 |
| CN | 101470629 A | 7/2009 |

(Continued)

*Primary Examiner* — Reginald G Bragdon
*Assistant Examiner* — Hannah A Faye
(74) *Attorney, Agent, or Firm* — Slater Matsil, LLP

(57) ABSTRACT

A write request processing method and a memory controller, where the method includes, determining a second write request set, by the memory controller, after determining that a quantity of write requests in a to-be-scheduled first write request set is less than a quantity of unoccupied storage units in a memory, where the write request in the first write request set is located before a first memory barrier, where a write request in the second write request set is a log write request, and where the write request in the second write request set is located behind the first memory barrier. The memory controller sends the write request in the first write request set and the write request in the second write request set in parallel to different unoccupied storage units in the memory.

15 Claims, 5 Drawing Sheets

(56) References Cited

U.S. PATENT DOCUMENTS

| | | |
|---|---|---|
| 2009/0172317 A1 | 7/2009 | Saha et al. |
| 2011/0264712 A1 | 10/2011 | Ylonen |
| 2013/0024630 A1 | 1/2013 | Campbell et al. |
| 2014/0122934 A1 | 5/2014 | Wang |
| 2014/0297918 A1 | 10/2014 | Lee et al. |
| 2014/0337562 A1 | 11/2014 | Long et al. |

FOREIGN PATENT DOCUMENTS

| | | |
|---|---|---|
| CN | 101699439 A | 4/2010 |
| CN | 102156720 A | 8/2011 |
| CN | 102436366 A | 5/2012 |

WRITE REQUEST PROCESSING METHOD AND MEMORY CONTROLLER

CROSS-REFERENCE TO RELATED APPLICATIONS

This application is a continuation of International Application No. PCT/CN2016/074044, filed on Feb. 18, 2016, which claims priority to Chinese Patent Application No. 201510242597.5, filed on May 13, 2015. The disclosures of the aforementioned applications are hereby incorporated by reference in their entireties.

TECHNICAL FIELD

The present invention relates to the computer field, and more specifically, to a write request processing method and a memory controller.

BACKGROUND

As a new type of memory, a non-volatile memory (NVM) has many advantages, such as addressing by bytes, no data loss after power outrage, high storage density, no need for frequent refreshing, and low consumption. Therefore, the NVM is appropriate as a memory (or referred to as a main memory). However, the NVM also has some disadvantages, such as a relatively long write delay, and a limited write quantity. The NVM and an existing dynamic random access memory (DRAM) may jointly form a hybrid memory. Temporary data generated by an application program may be stored into the DRAM, and permanent data generated by an application program may be stored into the NVM.

In order to use the NVM as a memory, an existing system structure and software architecture need to be re-designed or optimized. In a feasible method, a software transactional memory (STM) technology is used. The technology can enable management of the NVM memory while maintaining transaction characteristics. The transaction characteristics include atomicity, consistency, isolation, and durability of a transaction. In addition, because the STM technology is based on an existing programming model, managing and controlling the NVM by using the STM technology is likely to be accepted and used by a programmer.

To ensure consistency during use of an NVM memory, a write request scheduling order needs to meet a linearizability requirement. That is, for a same transaction, a memory controller needs to first sequentially send a log write request and a commit write request of the transaction to the NVM memory, and then send a data write request of the transaction to the NVM memory, so as to perform an in-place update on data of the transaction.

In the STM technology, non-volatile heaps are created to manage the NVM memory, and write-ahead logging (WAL) may be used to ensure transaction consistency. Specifically, the non-volatile heaps need to send a memory barrier (or referred to as a persistent memory barrier) request to the memory controller between sending a log write request and sending a commit write request to the memory controller and between sending a commit write request and sending a data write request to the memory controller, so that in a write request queue in the memory controller, the log write request, the commit write request, and the data write request of the same transaction are separated by memory barriers. Therefore, in consideration of impact of memory barriers, when sending a write request to an NVM memory, the memory controller cannot concurrently send two write requests separated by a memory barrier to the NVM memory. Although this write request processing manner ensures transaction consistency, a relatively small quantity of write requests are processed concurrently due to existence of the memory barrier. Therefore, storage space of a memory is not fully used, and write requests are processed at low efficiency.

SUMMARY

Embodiments of the present invention provide a write request processing method and a memory controller, to improve processing efficiency of a write request.

According to a first aspect, a write request processing method is provided. The method is executed by a memory controller in a computer system, the memory controller buffers a write request queue, the write request queue includes to-be-scheduled write requests of transactions, a memory of the computer system is an NVM, the memory includes multiple storage units, and the method includes determining that a quantity of write requests in a to-be-scheduled first write request set is less than a quantity of unoccupied storage units in the memory, where a first memory barrier exists between a write request in the first write request set and another write request in the write request queue, and the write request in the first write request set is located before the first memory barrier. The method further includes determining a second write request set, where a write request in the second write request set is a log write request, the write request in the second write request set is located behind the first memory barrier in the write request queue, and the sum of a quantity of write requests in the second write request set and the quantity of write requests in the first write request set is not greater than the quantity of unoccupied storage units in the memory. The method further includes sending the write request in the first write request set and the write request in the second write request set in parallel to different unoccupied storage units in the memory.

With reference to the first aspect, in an implementation manner of the first aspect, the method includes determining that a quantity of write requests in a to-be-scheduled third write request set is less than a quantity of unoccupied storage units in the memory, where a second memory barrier exists between a write request in the third write request set and another write request in the write request queue, and the write request in the third write request set is located before the second memory barrier, determining a fourth write request set, where a write request in the fourth write request set includes a commit write request or an abort write request, the write request in the fourth write request set is located behind the second memory barrier in the write request queue, the write request in the fourth write request set is separated from the write request in the third write request set by the second memory barrier, each write request in the fourth write request set is different from each write request in the third write request set in terms of transactions, and the sum of a quantity of write requests in the fourth write request set and the quantity of write requests in the third write request set is not greater than the quantity of unoccupied storage units in the memory, and sending the write request in the third write request set and the write request in the fourth write request set in parallel to different unoccupied storage units in the memory.

With reference to either the first aspect or the foregoing implementation manner of the first aspect, in another implementation manner of the first aspect, the determining a fourth write request set includes determining the fourth write request set according to a transaction identifier carried in a write request in the write request queue, where the transaction identifier is used to indicate a transaction to which the write request belongs.

With reference to any one of the first aspect or the foregoing implementation manners of the first aspect, in another implementation manner of the first aspect, the method further includes determining that a quantity of write requests in a to-be-scheduled fifth write request set is less than a quantity of unoccupied storage units in the memory, where a third memory barrier exists between a write request in the fifth write request set and another write request in the write request queue, the write request in the fifth write request set is located before the third memory barrier, and no write request in the fifth write request set is a log write request, determining a sixth write request set, where a write request in the sixth write request set is a commit write request or an abort write request, the write request in the sixth write request set is located behind the third memory barrier in the write request queue, the write request in the sixth write request set is separated from the write request in the fifth write request set by the third memory barrier, and the sum of a quantity of write requests in the sixth write request set and the quantity of write requests in the fifth write request set is not greater than the quantity of unoccupied storage units in the memory, and sending the write request in the fifth write request set and the write request in the sixth write request set in parallel to different unoccupied storage units in the memory.

With reference to any one of the first aspect or the foregoing implementation manners of the first aspect, in another implementation manner of the first aspect, the determining a second write request set includes determining a first storage unit set from the unoccupied storage units in the memory, where a storage unit in the first storage unit set is configured to receive a write request other than the write request in the first write request set, and selecting, from write requests that are located behind the first memory barrier in the write request queue, a log write request that is to be sent to the storage unit in the first storage unit set, where the selected log write request forms the second write request set.

With reference to any one of the first aspect or the foregoing implementation manners of the first aspect, in another implementation manner of the first aspect, the storage unit includes a bank in the memory.

According to a second aspect, a memory controller is provided. The memory controller is located in a computer system, the memory controller buffers a write request queue, the write request queue includes to-be-scheduled write requests of transactions, a memory of the computer system is an NVM, the memory includes multiple storage units, and the memory controller includes a comparison module, configured to determine that a quantity of write requests in a to-be-scheduled first write request set is less than a quantity of unoccupied storage units in the memory, where a first memory barrier exists between a write request in the first write request set and another write request in the write request queue, and the write request in the first write request set is located before the first memory barrier, a determining module, configured to determine a second write request set, where a write request in the second write request set is a log write request, the write request in the second write request set is located behind the first memory barrier in the write request queue, and the sum of a quantity of write requests in the second write request set and the quantity of write requests in the first write request set is not greater than the quantity of unoccupied storage units in the memory, and a processing module, configured to send the write request in the first write request set and the write request in the second write request set in parallel to different unoccupied storage units in the memory.

With reference to the second aspect, in an implementation manner of the second aspect, the comparison module is further configured to determine that a quantity of write requests in a to-be-scheduled third write request set is less than a quantity of unoccupied storage units in the memory, where a second memory barrier exists between a write request in the third write request set and another write request in the write request queue, and the write request in the third write request set is located before the second memory barrier, the determining module is further configured to determine a fourth write request set, where a write request in the fourth write request set includes a commit write request or an abort write request, the write request in the fourth write request set is located behind the second memory barrier in the write request queue, the write request in the fourth write request set is separated from the write request in the third write request set by the second memory barrier, each write request in the fourth write request set is different from each write request in the third write request set in terms of transactions, and the sum of a quantity of write requests in the fourth write request set and the quantity of write requests in the third write request set is not greater than the quantity of unoccupied storage units in the memory, and the processing module is further configured to send the write request in the third write request set and the write request in the fourth write request set in parallel to different unoccupied storage units in the memory.

With reference to either the second aspect or the foregoing implementation manner of the second aspect, in another implementation manner of the second aspect, the determining module is specifically configured to determine the fourth write request set according to a transaction identifier carried in a write request in the write request queue, where the transaction identifier is used to indicate a transaction to which the write request belongs.

With reference to any one of the second aspect or the foregoing implementation manners of the second aspect, in another implementation manner of the second aspect, the comparison module is further configured to determine that a quantity of write requests in a to-be-scheduled fifth write request set is less than a quantity of unoccupied storage units in the memory, where a third memory barrier exists between a write request in the fifth write request set and another write request in the write request queue, the write request in the fifth write request set is located before the third memory barrier, and no write request in the fifth write request set is a log write request, the determining module is further configured to determine a sixth write request set, where a write request in the sixth write request set is a commit write request or an abort write request, the write request in the sixth write request set is located behind the third memory barrier in the write request queue, the write request in the sixth write request set is separated from the write request in the fifth write request set by the third memory barrier, and the sum of a quantity of write requests in the sixth write request set and the quantity of write requests in the fifth write request set is not greater than the quantity of unoccupied storage units in the memory, and the processing module is further configured to send the write request in the fifth write request set and the write request in the sixth write request set in parallel to different unoccupied storage units in the memory.

With reference to any one of the second aspect or the foregoing implementation manners of the second aspect, in another implementation manner of the second aspect, the determining module is specifically configured to determine a first storage unit set from the unoccupied storage units in the memory, where a storage unit in the first storage unit set is configured to receive a write request other than the write request in the first write request set, and select, from write requests that are located behind the first memory barrier in the write request queue, a log write request that is to be sent to the storage unit in the first storage unit set, where the selected log write request forms the second write request set.

With reference to any one of the second aspect or the foregoing implementation manners of the second aspect, in another implementation manner of the second aspect, the storage unit includes a bank in the memory.

According to a third aspect, a write request processing method is provided. The method is executed by a memory controller in a computer system, the memory controller buffers a write request queue, the write request queue includes to-be-scheduled write requests of transactions, a memory of the computer system is an NVM, the memory includes multiple storage units, and the method includes: determining that a first write request in the write request queue is a log write request, where the first write request is located behind a second write request in the write request queue, and the first write request is separated from the second write request by a memory barrier; and sending the first write request and the second write request in parallel to different unoccupied storage units in the memory.

With reference to the third aspect, in an implementation manner of the third aspect, the determining that a first write request in the write request queue is a log write request includes, determining, according to a type identifier in the first write request, that the first write request is a log write request, where the type identifier is used to indicate that the first write request is a log write request.

With reference to either the third aspect or the foregoing implementation manner of the third aspect, in another implementation manner of the third aspect, the storage unit includes a bank in the memory.

According to a fourth aspect, a memory controller is provided. The memory controller is located in a computer system, the memory controller buffers a write request queue, the write request queue includes to-be-scheduled write requests of transactions, a memory of the computer system is an NVM, the memory includes multiple storage units, and the memory controller includes: a determining unit, configured to determine that a first write request in the write request queue is a log write request, where the first write request is located behind a second write request in the write request queue, and the first write request is separated from the second write request by a memory barrier, and a processing unit, configured to send the first write request and the second write request in parallel to different unoccupied storage units in the memory.

With reference to the fourth aspect, in an implementation manner of the fourth aspect, the determining unit is specifically configured to determine, according to a type identifier in the first write request, that the first write request is a log write request, where the type identifier is used to indicate that the first write request is a log write request.

With reference to either the fourth aspect or the foregoing implementation manner of the fourth aspect, in another implementation manner of the fourth aspect, the storage unit includes a bank in the memory.

In the embodiments of the present invention, each write request in a second write request set is a log write request, and is separated from a write request in a first write request set by a first memory barrier. In other words, a log write request separated behind the first memory barrier is scheduled with higher priority without limitation of the first memory barrier. Therefore, storage units that can receive write requests in parallel can be used more efficiently in a memory, and the write requests are processed at higher efficiency.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are a part rather than all of the embodiments of the present invention.

Figure 1:
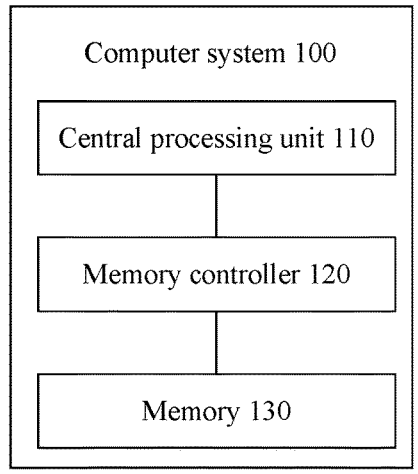
FIG. 1 is an example diagram of a system architecture of a computer system according to an embodiment of the present invention.

For ease of understanding, a computer system 100 according to an embodiment of the present invention is generally described with reference to FIG. 1. As shown in FIG. 1, the computer system 100 includes a central processing unit (CPU) 110, a memory controller 120, and a memory 130. The CPU 110 is configured to send a write request of a transaction to a write request queue in the memory controller 120.

As shown in FIG. 1, the CPU 110 is an operation core and a control core in the computer system 100. The CPU 110 may be a very large-scale integrated circuit. An operating system and other software programs are installed in the CPU 110, so that the CPU 110 can access a memory, a buffer, and a disk. It may be understood that, in this embodiment of the present invention, the CPU 110 is merely an example of a processor. In addition to the CPU 110, the processor may be another application-specific integrated circuit (ASIC), or may be one or more integrated circuits that are configured to implement this embodiment of the present invention.

The memory controller 120 is a bus circuit controller in the computer system 100, and used for controlling the memory 130 and managing and planning a speed of data transmission from the memory 130 to the CPU 110. Data may be exchanged between the memory 130 and the CPU 110 by using the memory controller 120. The memory controller 120 may be a separate chip, and connect to the CPU 110 by using a system bus. A person skilled in the art may know that the memory controller 120 may be integrated into a related large-scale chip. For example, the memory controller 120 may be integrated into a microprocessor (such as the CPU 110) or be embedded in a northbridge. A specific location of the memory controller 120 is not limited in this embodiment of the present invention. For ease of description, the memory controller 120 separately disposed in the system architecture shown in FIG. 1 is used as an example for description. The memory controller 120 controls necessary logic to write data into the memory 130 or read data from the memory 130.

The memory 130 is a main memory of the computer system 100. The memory 130 is usually used for storing various types of running software in the operating system, input and output data, information exchanged with an external memory, and the like. To improve an access speed of the CPU 110, the memory 130 needs to have an advantage of a high access speed. In a conventional computer system architecture, a dynamic random access memory (DRAM) is usually used as the memory 130. With development of a non-volatile memory (NVM) technology, an NVM is also gradually used as a memory.

A person skilled in the art may know that a next-generation NVM features high access speed and non-volatility. In addition, the next-generation NVM can address by bytes, and write data in bits into a non-volatile storage medium. Therefore, when used as a memory, the next-generation NVM can reduce data access latency as a dynamic random access memory (DRAM) does. In addition, compared with the DRAM, the NVM has non-volatility and can store data better. The next-generation NVM may include a next-generation non-volatile memory, such as a phase change memory (PCM), a resistive random access memory (RRAM), a magnetic random access memory (MRAM), or a ferroelectric random access memory (FRAM). In the computer system 100 provided in this embodiment of the present invention, the memory 130 is a non-volatile storage medium of the next-generation non-volatile memory. The storage medium may include multiple storage units.

It may be understood that the description herein is merely an example of the computer system architecture. In reality, the memory of the computer system may be a hybrid memory including a DRAM and an NVM. The DRAM may be configured to store provisional data (or referred to as temporary data), and the NVM may be configured to store permanent data.

A person skilled in the art may know that storage space in the NVM may be divided into different levels of storage units according to die package combinations. It should be noted that, in this embodiment of the present invention, a storage unit is used to indicate storage unit space including different memory die combinations. For example, one memory may include two or four channels. Each channel may include two dual in-line memory modules (DIMM). Each DIMM may include one or two ranks. Each rank may include multiple chips. Each chip may include multiple banks. Each bank is an array including multiple columns and rows. The banks may be smallest storage units that can receive (or process) write requests in parallel. The storage unit in this embodiment of the present invention may be a bank, or a storage unit whose die is greater than that of a bank, such as a chip, a rank, a DIMM, or a channel. The bank is mainly used as an example in the following.

The NVM memory may perform transaction management by using an STM technology. In a process of the transaction management based on the STM technology, to ensure transaction linearizability, an execution process of a same transaction is first storing a log of the transaction, then storing a commit item of the transaction, and finally storing data of the transaction. To ensure this execution sequence, an application program that runs in the CPU 110 not only needs to sequentially send a log write request, a commit write request, and a data write request of a transaction to the memory controller 120, but also needs to send a memory barrier request to the memory controller 120 between sending the log write request, the commit write request and the data write request of the transaction. From a perspective of the memory controller 120, a buffer of the memory controller 120 buffers a write request queue. In addition to a log write request, a commit write request, and a data write request of a transaction, the write request queue further stores memory barriers separating the log write request, the commit write request, and the data write request of the same transaction, to ensure transaction linearizability. The memory controller 120 sends write requests in the write request queue to the NVM memory.

Figure 2:
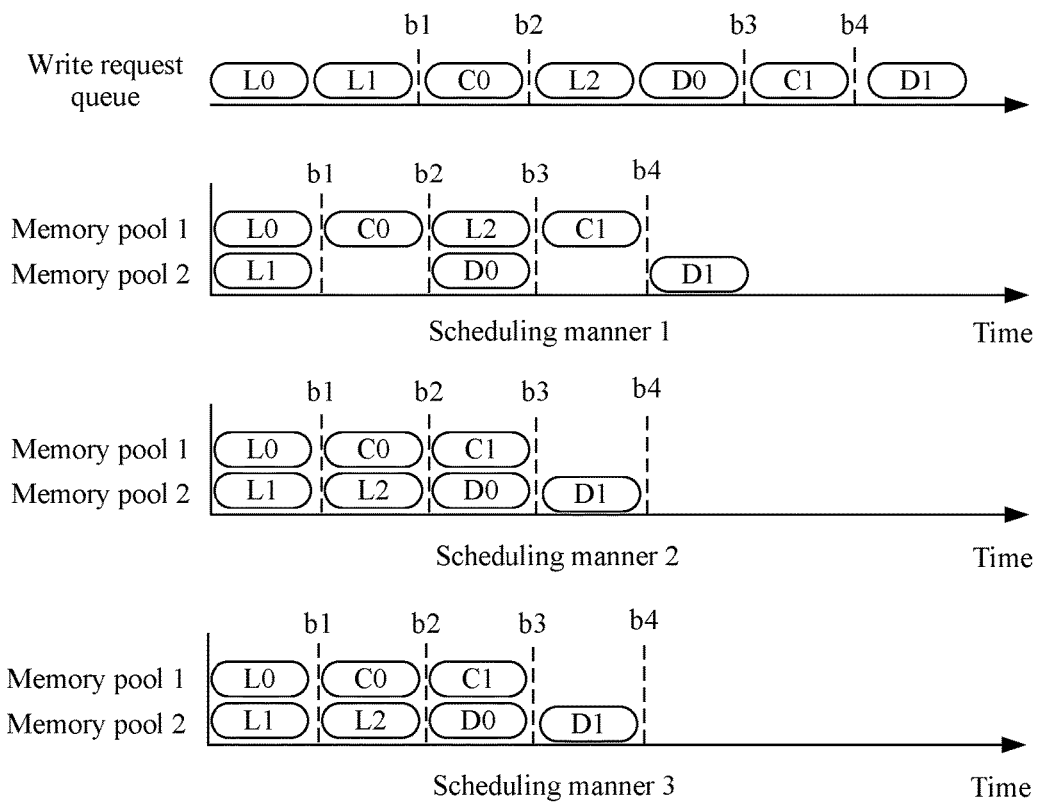
FIG. 2 is an example diagram of a write request scheduling manner according to an embodiment of the present invention.

In the following, an example of a write request scheduling process of the memory controller 120 is described with reference to FIG. 2. It is assumed that in a write request queue, write requests and memory barriers are arranged in an order of L0, L1, b1, C0, b2, L2, D0, b3, C1, b4, D1. In this figure, b1, b2, b3, and b4 are four memory barriers. L0, C0, and D0 belong to a transaction 0. L0 is a log write request of the transaction 0, C0 is a commit write request of the transaction 0, and D0 is a data write request of the transaction 0. Likewise, L1, L2, C1, and D1 belong to a transaction 1. L1 and L2 are log write requests of the transaction 1, C1 is a commit write request of the transaction 1, and D1 is a data write request of the transaction 1. It is assumed that an NVM includes two banks, and the two banks are in an idle state. Referring to a scheduling manner 1 in FIG. 2, that is, a prior-art scheduling manner, both L0 and L1 are located before the memory barrier b1, and may be simultaneously sent to different banks in a memory. Therefore, in a first scheduling period, the memory controller sends L0 and L1 in parallel to the NVM memory. Because C0 is located between the two memory barriers b1 and b2, in a second scheduling period, the memory controller can separately send only C0 to one bank. In this scheduling manner, the other bank resource in the NVM memory is wasted, and parallel capabilities of the banks in the NVM memory are not fully used.

To resolve the foregoing problem, the embodiments of the present invention provide a write request processing method, to optimize the write request processing manner. In the following, detailed descriptions are provided with reference to FIG. 3.

Figure 3:
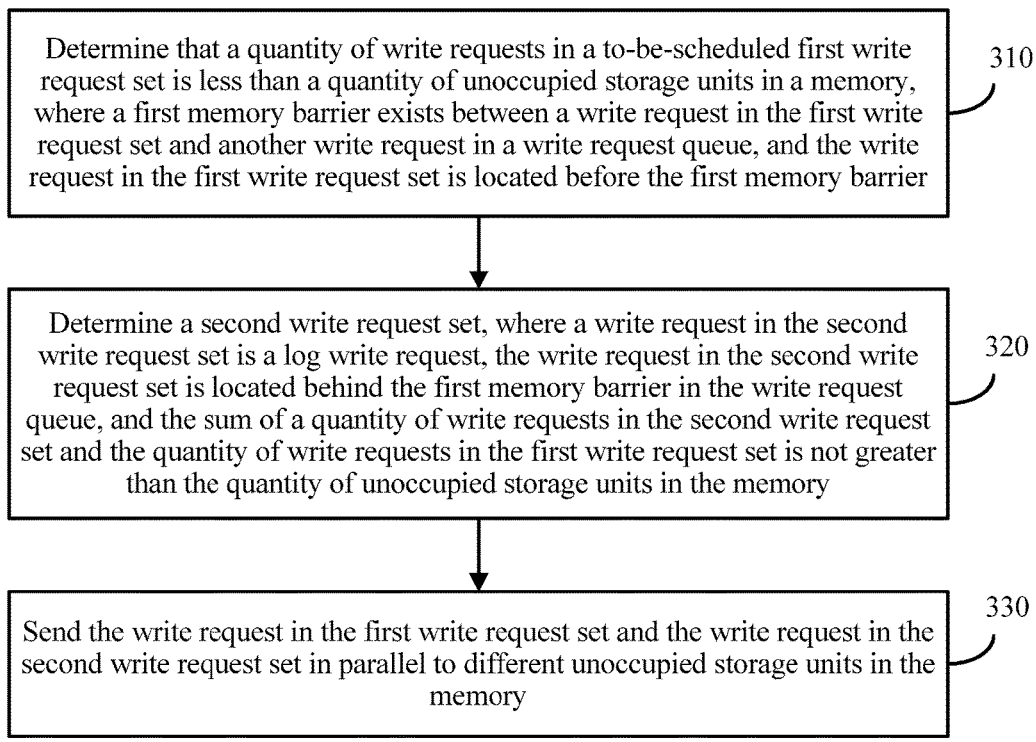
FIG. 3 is a schematic flowchart of a write request processing method according to an embodiment of the present invention.

FIG. 3 is a schematic flowchart of a write request processing method according to an embodiment of the present invention. The method in FIG. 3 may be executed by the memory controller 120 in the computer system 100 described in FIG. 1. The memory controller buffers a write request queue, and the write request queue includes to-bescheduled write requests of transactions. A write request of a transaction is used to write data into the memory 130 in the computer system 100. The memory controller may be configured to send the write requests in the write request queue to the memory (in other words, the memory controller may be configured to write data of the write requests in the write request queue into the memory). The memory is an NVM, and the memory includes multiple storage units that can receive write requests in parallel. The storage unit may be, for example, a bank, a rank, or a channel.

It should be noted that the write request of the transaction may include a log write request, a log control write request, and a data write request. The log write request may also be referred to as a log data write request. The log write request may be used to write log data of the transaction into the memory. The log control write request may also be referred to as a log control data write request. The log control write request may be used to write log control data of the transaction into the memory. For example, the log control write request may include a data commit request or a data abort request. The data write request may be used to write data, other than the log data and the log control data, of the transaction into the memory.

The memory controller buffers the write request queue that may also be referred to as a write request sequence. The write request queue may include write requests of one or more transactions. When the write request queue includes write requests of multiple transactions, an arrangement order of write requests of each transaction in the queue meets the following requirement: A log write request of the transaction is located before a commit write request (or an abort write request) of the transaction, the commit write request of the transaction is located before a data write request of the transaction, and different types of write requests of each transaction are separated by memory barriers. However, an order of write requests of multiple transactions may not be limited. In other words, the write requests of multiple transactions may be arranged in an interleaved manner in the write request queue. The memory controller may send the write requests in the write request queue to the memory by using a batch operation (or referred to as a write batch operation). For a quantity of write requests that can be scheduled in the batch operation, both a quantity of currently unoccupied banks (for example, some banks may be occupied by read requests) in the memory and a memory barrier location in the write request queue need to be considered. For example, three banks are currently unoccupied, and a memory barrier exists behind first two write requests in a write request queue. Then, in the prior-art scheduling manner, a maximum of two write requests can be scheduled. That is, a maximum of two write requests can be sent in parallel to two banks in the memory. The two banks in the memory can write data carried in the write requests into the memory according to the two write requests that are sent in parallel.

The method in FIG. 3 includes the following steps.

310. Determine that a quantity of write requests in a to-be-scheduled first write request set is less than a quantity of unoccupied storage units in the memory, where a first memory barrier exists between a write request in the first write request set and another write request in the write request queue, and the write request in the first write request set is located before the first memory barrier.

It should be understood that the unoccupied storage unit in the memory may refer to a storage unit that is in an idle state in the memory, or a storage unit that can receive or process a write request in a current scheduling period in the memory.

For example, the memory controller may first determine the to-be-scheduled first write request set. Using the bank as an example, the first write request set may be determined in the following manner: The memory controller first determines a quantity of currently unoccupied banks in the memory. For example, the memory includes four banks, one bank is currently occupied by a read request, and three banks are in an idle state, so the quantity of currently unoccupied banks may be 3. Then, the memory controller may select a write request from the write request queue according to an order from the front to the back. In this case, a maximum of three write requests may be scheduled. However, if first three write requests in the write request queue are separated by a memory barrier, for example, the memory barrier is disposed between the second write request and the third write request, the memory controller can select only a maximum of the first two write requests to form the to-be-scheduled first write request set.

320. Determine a second write request set, where a write request in the second write request set is a log write request, the write request in the second write request set is located behind the first memory barrier in the write request queue, and the sum of a quantity of write requests in the second write request set and the quantity of write requests in the first write request set is not greater than the quantity of unoccupied storage units in the memory.

It should be noted that the second write request set may include one log write request, or may include multiple log write requests. The memory controller may determine the second write request set in multiple manners. For example, an application program running in a CPU may first add a type identifier of a write request into the write request. The memory controller may select a log write request from the write request queue according to the type identifier of the write request, to obtain the second write request set. The type identifier of the write request may be a new identifier field that is added into the write request and that is used to identify a write request type, or may be identified by using a remaining bit, other than an effective address bit, of a write address in the write request.

It should be noted that because the write requests in the second write request set and the first write request set are about to be sent to different storage units in the memory, different addresses of the write requests in the second write request set and the first write request set correspond to different storage units.

330. Send the write request in the first write request set and the write request in the second write request set in parallel to different unoccupied storage units in the memory.

It should be understood that step 330 may include: writing, by using one batch operation (may also be referred to as a write batch operation), data of the write request in the first write request set and data of the write request in the second write request set into different unoccupied storage units in the memory separately.

It should also be understood that the write requests in the first write request set and the second write request set are sent to different storage units. Using the bank as an example, if the first write request set includes two write requests, and the second write request set includes two write requests, these four write requests are sent to four different banks.

In this embodiment of the present invention, each write request in a second write request set is a log write request, and is separated from a write request in a first write request set by a first memory barrier. In other words, a log write request separated behind the first memory barrier is scheduled with higher priority without limitation of the first memory barrier. Therefore, storage units that can receive write requests in parallel can be used more efficiently in a memory, and the write requests are processed at higher efficiency.

Figure 4:
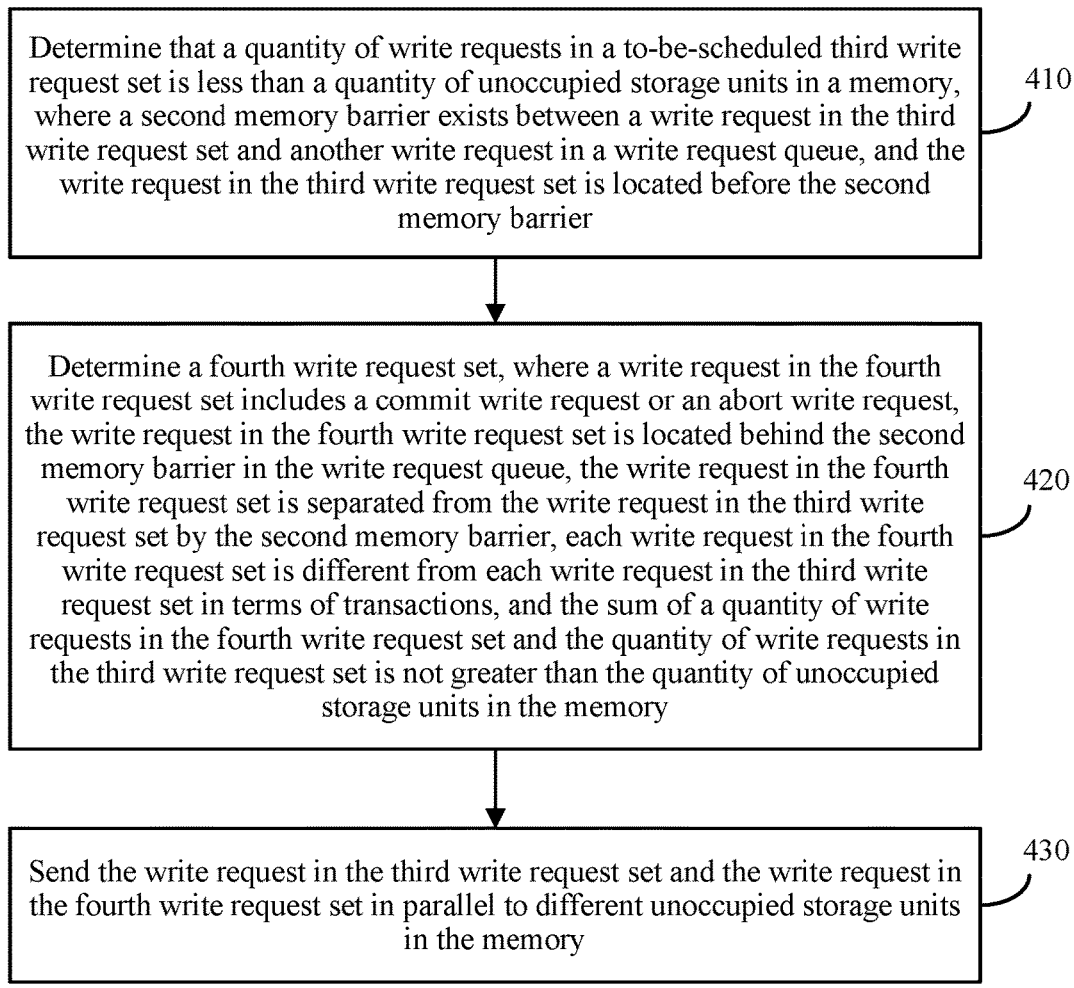
FIG. 4 is a schematic flowchart of a write request processing method according to an embodiment of the present invention.

Optionally, in an embodiment, as shown in FIG. 4, the method may further include the following steps.

410. Determine that a quantity of write requests in a to-be-scheduled third write request set is less than a quantity of unoccupied storage units in a memory, where a second memory barrier exists between a write request in the third write request set and another write request in a write request queue, and the write request in the third write request set is located before the second memory barrier.

420. Determine a fourth write request set, where a write request in the fourth write request set includes a commit write request or an abort write request, the write request in the fourth write request set is located behind the second memory barrier in the write request queue, and is separated from the write request in the third write request set by the second memory barrier (alternatively, the write request in the fourth write request set is located behind the second memory barrier in the write request queue, and the write request in the fourth write request set is separated from the write request in the third write request set by the one memory barrier), each write request in the fourth write request set is different from each write request in the third write request set in terms of transactions, and the sum of a quantity of write requests in the fourth write request set and the quantity of write requests in the third write request set is not greater than the quantity of unoccupied storage units in the memory.

430. Send the write request in the third write request set and the write request in the fourth write request set in parallel to different unoccupied storage units in the memory.

In this embodiment of the present invention, on a premise that transaction consistency is not damaged, a memory controller schedules a commit write request or an abort write request with higher priority without limitation of a memory barrier, so that storage units that can receive write requests in parallel are used more efficiently in a memory, and the write requests are processed at higher efficiency.

It should be noted that the implementation manner in FIG. 4 and the implementation manner in FIG. 3 may be mutually independent implementation manners, or may be integrated into one solution. The scheduling manner 2 in FIG. 2 is an example in which the two implementation manners are integrated into one solution. Specifically, in a first scheduling period, the memory controller sends L0 and L1 that are located before b1 to different banks in the NVM memory by using one batch operation. In a second scheduling period, the memory controller uses the implementation manner corresponding to FIG. 3 to send, by using one batch operation, C0 and the log write request L2 separated from C0 by b2 to the bank 1 and the bank 2 respectively. Then in a third scheduling period, the memory controller uses the implementation manner corresponding to FIG. 4 to send, by using one batch operation, D0 and the commit write request C1 that do not belong to the same transaction as D0 to the bank 1 and the bank 2 respectively. At last, in a fourth scheduling period, only D1 is scheduled. By comparing the scheduling manner 1 with the scheduling manner 2, it may be learned that one scheduling period is saved in the scheduling manner 2, so that a write request is processed at higher efficiency.

It should be further noted that the fourth write request set may be determined in multiple manners. For example, the fourth write request set is determined according to a transaction identifier carried in a write request in the write request queue. A transaction identifier of a write request indicates a transaction to which the write request belongs. The transaction identifier may be a new identifier that is added into a write request and that is used to identify a transaction to which the write request belongs, or may be identified by using a remaining bit, other than an effective address bit, of a write address in the write request. Specifically, if a computer system in which the memory and the memory controller are located is a 64-bit system, an address in the 64-bit system is 64-bit aligned. However, in reality, virtual addressing space of a CPU has only 48 bits actually. A write address has a maximum of 48 effective bits, and a part of or all fields in the remaining 16 bits may be used as a transaction identifier.

Figure 5:
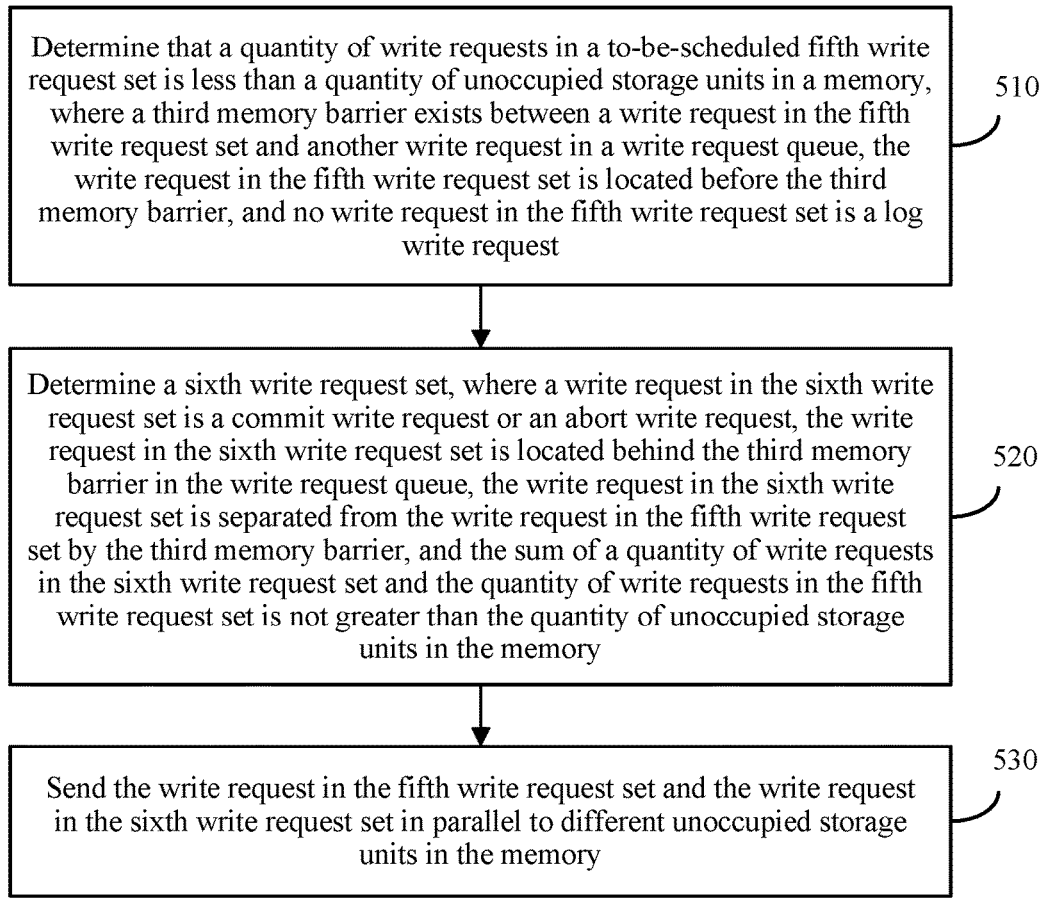
FIG. 5 is a schematic flowchart of a write request processing method according to an embodiment of the present invention.

Optionally, in an embodiment, as shown in FIG. 5, the method may further include the following steps.

510. Determine that a quantity of write requests in a to-be-scheduled fifth write request set is less than a quantity of unoccupied storage units in a memory, where a third memory barrier exists between a write request in the fifth write request set and another write request in a write request queue, the write request in the fifth write request set is located before the third memory barrier, and no write request in the fifth write request set is a log write request.

It should be noted that, before step 510, the method in FIG. 5 may further include: determining, by a memory controller, the fifth write request set; and determining, according to a type identifier of a write request, that no write request in the fifth write request set is a log write request. The type identifier of the write request may be a new identifier field, other than a write address and write data, added into the write request, or may be identified by using an unused field in the current write request. Specifically, if a computer system is a 64-bit system, for ease of mapping virtual address space, a total quantity of bits of a write address in a write request is usually set to 64. However, in reality, the write address has a maximum of 48 effective bits, and some or all of the remaining 16 bits may serve as the type identifier of the write request.

520. Determine a sixth write request set, where a write request in the sixth write request set is a commit write request or an abort write request, the write request in the sixth write request set is located behind the third memory barrier in the write request queue, the write request in the sixth write request set is separated from the write request in the fifth write request set by the third memory barrier, and the sum of a quantity of write requests in the sixth write request set and the quantity of write requests in the fifth write request set is not greater than the quantity of unoccupied storage units in the memory.

Alternatively, the write request in the sixth write request set is located behind the third memory barrier in the write request queue, and is separated from the write request in the fifth write request set by the one memory barrier.

530. Send the write request in the fifth write request set and the write request in the sixth write request set in parallel to different unoccupied storage units in the memory.

In this embodiment of the present invention, on a premise that transaction consistency is not damaged, a memory controller schedules a commit write request or an abort write request without limitation of a memory barrier, so that storage units that can process write requests in parallel are used more efficiently in a memory, and the write requests are processed at higher efficiency.

It should be noted that the implementation manner in FIG. 5 and the implementation manner in FIG. 3 may be mutually independent implementation manners, or may be integrated into one solution. The scheduling manner 3 in FIG. 2 is an example in which the two implementation manners are integrated into one solution. Specifically, in a first scheduling period, the memory controller sends L0 and L1 that are located before b1 to different banks in the NVM memory. In a second scheduling period, the memory controller uses the implementation manner corresponding to FIG. 3 to send C0 and the log write request L2 separated from C0 by b2 to the bank 1 and the bank 2 respectively. Then in a third scheduling period, because D0 is not a log write request, the memory controller uses the implementation manner corresponding to FIG. 5 to separately send D0 and the commit write request C1 to the bank 1 and the bank 2. At last, in a fourth scheduling period, only D1 is scheduled. By comparing the scheduling manner 1 with the scheduling manner 2, it may be learned that one scheduling period is saved in the scheduling manner 2, so that a write request is processed at higher efficiency. It should be noted that, although the same result is finally obtained by using the scheduling manner 2 and the scheduling manner 3, scheduling C1 and D0 together is based on different rules.

Optionally, in an embodiment, step 320 may include: determining a first storage unit set from the unoccupied storage units in the memory, where a storage unit in the first storage unit set is configured to receive a write request other than the write request in the first write request set (alternatively, the storage unit in the first storage unit set is not configured to receive the write request in the first write request set); and selecting, from write requests located behind the first memory barrier in the write request queue, a log write request that is to be sent to the storage unit in the first storage unit set, where the selected log write request forms the second write request set.

It should be understood that, according to an address in a write request, a storage unit to which the write request is sent may be determined. The determining a first storage set from the unoccupied storage units in the memory may include: selecting the first storage unit set from the unoccupied storage units in the memory according to an address of the write request in the first write request set. Using the bank as an example, it is assumed that four banks are currently unoccupied, including a bank 1, a bank 2, a bank 3, and a bank 4. A first write request set includes two write requests, including a write request 1 and a write request 2. It may be determined, according to an address of the write request 1, that the write request 1 is about to be sent to the bank 1, and it may be determined, according to an address of the write request 2, that the write request 2 is about to be sent to the bank 2. Therefore, the first storage unit set includes the bank 3 and the bank 4. The selecting, from write requests located behind the first memory barrier in the write request queue, a log write request that is to be sent to the storage unit in the first storage unit set may include: according to addresses and type identifiers of the write requests located behind the first memory barrier in the write request queue, selecting the log write request that is to be sent to the storage unit in the first storage unit. Still using the foregoing example, behind the first memory barrier, one log write request that is about to be sent to the bank 3 and one log write request that is about to be sent to the bank 4 are selected. These two selected write requests form the second write request set.

It should be understood that the "first", "second", "third", "fourth", and "fifth" are merely identifiers introduced for clearly describing different embodiments, and do not impose limitation on an order. For example, the first memory barrier and the second memory barrier are merely to distinguish between these two memory barriers, but are not limited to that the second memory barrier is a memory barrier located in the second place of the write request queue, or that the second memory barrier is located behind the first memory barrier.

The following describes the embodiments of the present invention in more detail with reference to a specific example. It should be noted that, the example in FIG. 3 is intended only to help a person skilled in the art to understand the embodiments of the present invention, but is not intended to limit the embodiments of the present invention to an illustrated specific value or specific scenario. Apparently, a person skilled in the art may perform various equivalent modifications or changes according to the example given in FIG. 3, and such modifications or changes also fall within the scope of the embodiments of the present invention.

The write request processing method according to the embodiments of the present invention is described in detail in the foregoing with reference to FIG. 1 to FIG. 5. The memory controller according to the embodiments of the present invention is described in detail in the following with reference to FIG. 6 and FIG. 7. It should be understood that a memory controller described in FIG. 6 or FIG. 7 can implement each step executed by the memory controller in FIG. 1 to FIG. 5. For brevity, repeated description is properly omitted.

Figure 6:
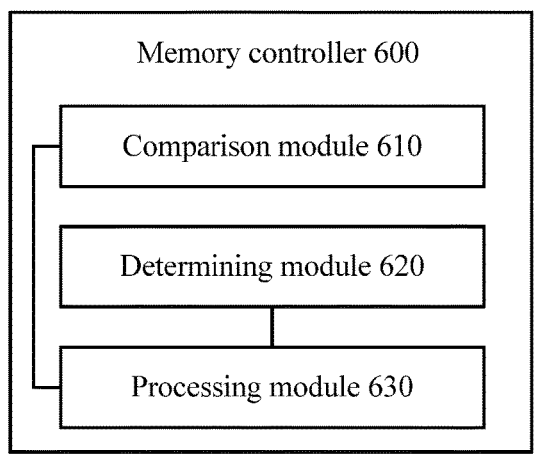
FIG. 6 is a schematic block diagram of a memory controller according to an embodiment of the present invention.

FIG. 6 is a schematic block diagram of a memory controller according to an embodiment of the present invention. The memory controller is located in a computer system. A memory controller 600 buffers a write request queue, and the write request queue includes to-be-scheduled write requests of transactions. A memory in the computer system is an NVM, and the memory includes multiple storage units. The memory controller 600 includes a comparison module 610, configured to determine that a quantity of write requests in a to-be-scheduled first write request set is less than a quantity of unoccupied storage units in the memory, where a first memory barrier exists between a write request in the first write request set and another write request in the write request queue, and the write request in the first write request set is located before the first memory barrier, a determining module 620, configured to determine a second write request set, where a write request in the second write request set is a log write request, the write request in the second write request set is located behind the first memory barrier in the write request queue, and the sum of a quantity of write requests in the second write request set and the quantity of write requests in the first write request set is not greater than the quantity of unoccupied storage units in the memory, and a processing module 630, configured to send the write request in the first write request set and the write request in the second write request set in parallel to different unoccupied storage units in the memory.

In this embodiment of the present invention, each write request in a second write request set is a log write request, and is separated from a write request in a first write request set by a first memory barrier. In other words, a log write request separated behind the first memory barrier is scheduled with higher priority without limitation of the first memory barrier. Therefore, storage units that can receive write requests in parallel can be used more efficiently in a memory, and the write requests are processed at higher efficiency.

Optionally, in an embodiment, the comparison module 610 is further configured to determine that a quantity of write requests in a to-be-scheduled third write request set is less than a quantity of unoccupied storage units in the memory. A second memory barrier exists between a write request in the third write request set and another write request in the write request queue, and the write request in the third write request set is located before the second memory barrier. The determining module 620 is further configured to determine a fourth write request set. A write request in the fourth write request set includes a commit write request or an abort write request, the write request in the fourth write request set is located behind the second memory barrier in the write request queue, the write request in the fourth write request set is separated from the write request in the third write request set by the second memory barrier, each write request in the fourth write request set is different from each write request in the third write request set in terms of transactions, and the sum of a quantity of write requests in the fourth write request set and the quantity of write requests in the third write request set is not greater than the quantity of unoccupied storage units in the memory. The processing module 630 is further configured to send the write request in the third write request set and the write request in the fourth write request set in parallel to different unoccupied storage units in the memory.

Optionally, in an embodiment, the determining module 620 is specifically configured to determine the fourth write request set according to a transaction identifier carried in a write request in the write request queue. The transaction identifier is used to indicate a transaction to which the write request belongs.

Optionally, in an embodiment, the comparison module 610 is further configured to determine that a quantity of write requests in a to-be-scheduled fifth write request set is less than a quantity of unoccupied storage units in the memory. A third memory barrier exists between a write request in the fifth write request set and another write request in the write request queue, the write request in the fifth write request set is located before the third memory barrier, and no write request in the fifth write request set is a log write request. The determining module 620 is further configured to determine a sixth write request set. A write request in the sixth write request set includes a commit write request or an abort write request, the write request in the sixth write request set is located behind the third memory barrier in the write request queue, the write request in the sixth write request set is separated from the write request in the fifth write request set by the third memory barrier, and the sum of a quantity of write requests in the sixth write request set and the quantity of write requests in the fifth write request set is not greater than the quantity of unoccupied storage units in the memory. The processing module 630 is further configured to send the write request in the fifth write request set and the write request in the sixth write request set in parallel to different unoccupied storage units in the memory.

Optionally, in an embodiment, the determining module 620 is specifically configured to: determine a first storage unit set from the unoccupied storage units in the memory, where a storage unit in the first storage unit set is configured to receive a write request other than the write request in the first write request set; and select, from write requests that are located behind the first memory barrier in the write request queue, a log write request that is to be sent to the storage unit in the first storage unit set, where the selected log write request forms the second write request set.

Optionally, in an embodiment, the storage unit includes a bank in the memory.

Figure 7:
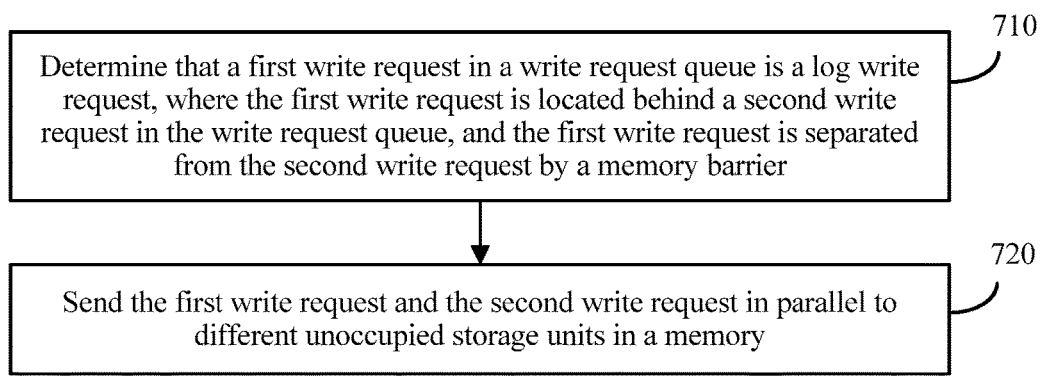
FIG. 7 is a schematic flowchart of a write request processing method according to an embodiment of the present invention.

FIG. 7 is a schematic flowchart of a write request processing method according to an embodiment of the present invention. The method in FIG. 7 may be executed by a memory controller in a computer system, such as the memory controller 120 in the computer system 100 in FIG. 1. The memory controller buffers a write request queue, and the write request queue includes to-be-scheduled write requests of transactions. A write request of a transaction is used to write data into a memory in the computer system. The memory controller may be configured to send the write request in the write request queue to the memory (in other words, the memory controller may be configured to write data of the write requests in the write request queue into the memory). The memory is an NVM, and the memory includes multiple storage units. The storage unit may be, for example, a bank, a rank, or a channel.

It should be noted that the write request of the transaction may include a log write request, a log control write request, and a data write request. The log write request may also be referred to as a log data write request. The log write request may be used to write log data of the transaction into the memory. The log control write request may also be referred to as a log control data write request. The log control write request may be used to write log control data of the transaction into the memory, such as commit data or abort data. The data write request may be used to write data, other than the log data and the log control data, of the transaction into the memory.

The memory controller buffers the write request queue that may also be referred to as a write request sequence. The write request queue may include write requests of one or more transactions. When the write request queue includes write requests of multiple transactions, an arrangement order of write requests of each transaction in the queue meets the following requirement: A log write request of the transaction is located before a commit write request (or an abort write request) of the transaction, the commit write request of the transaction is located before a data write request of the transaction, and different types of write requests of each transaction are separated by memory barriers. However, an order of write requests of multiple transactions may not be limited. In other words, the write requests of multiple transactions may be arranged in an interleaved manner in the write request queue. The memory controller may send the write requests in the write request queue to the memory by using a batch operation (or referred to as a write batch operation). For a quantity of write requests that can be scheduled in the batch operation, both a quantity of currently unoccupied banks (for example, some banks may be occupied by read requests) in the memory and a memory barrier location in the write request queue need to be considered. For example, three banks are currently unoccupied, and a memory barrier exists behind first two write requests in a write request queue. Then, in the prior-art scheduling manner, a maximum of two write requests can be scheduled. That is, a maximum of two write requests can be sent in parallel to two banks in the memory.

The method in FIG. 7 includes the following steps.

710. Determine that a first write request in the write request queue is a log write request, where the first write request is located behind a second write request in the write request queue, and the first write request is separated from the second write request by a memory barrier.

720. Send the first write request and the second write request in parallel to different unoccupied storage units in the memory.

In this embodiment of the present invention, a second write request is a log write request, and is separated from a first write request by a memory barrier. In other words, a log write request separated behind the memory barrier is scheduled with higher priority without limitation of the memory barrier. Therefore, storage units that can receive write requests in parallel can be used more efficiently in a memory, and the write requests are processed at higher efficiency.

Optionally, in an embodiment, step 710 may include: determining, according to a type identifier of the first write request, that the first write request is a log write request. The type identifier of the first write request is used to indicate that the first write request is a log write request. The type identifier of the write request may be a new identifier field, other than a write address and write data, added into the write request, or may be identified by using an unused field in the current write request. Specifically, if the computer system is a 64-bit system, for ease of mapping virtual address space, a total quantity of bits of a write address in a write request is usually set to 64. However, in reality, the write address has a maximum of 48 effective bits, and some or all of the remaining 16 bits may serve as the type identifier of the write request.

Figure 8:
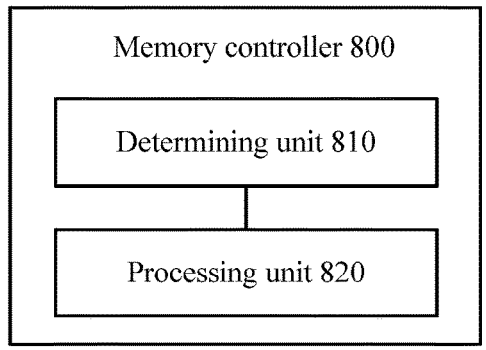
FIG. 8 is a schematic block diagram of a memory controller according to an embodiment of the present invention.

FIG. 8 is a schematic block diagram of a memory controller according to an embodiment of the present invention. A memory controller 800 in FIG. 8 is located in a computer system. The memory controller 800 buffers a write request queue, and the write request queue includes to-be-scheduled write requests of transactions. The memory controller 800 is configured to send the write requests in the write request queue to a memory. The memory in the computer system is an NVM, and the memory includes multiple storage units that can receive write requests in parallel. The memory controller 800 includes a determining unit 810, configured to determine that a first write request in the write request queue is a log write request, where the first write request is located behind a second write request in the write request queue, and the first write request is separated from the second write request by a memory barrier, and a processing unit 820, configured to send the first write request and the second write request in parallel to different unoccupied storage units in the memory.

In this embodiment of the present invention, a second write request is a log write request, and is separated from a first write request by a memory barrier. In other words, a log write request separated behind the memory barrier is scheduled with higher priority without limitation of the memory barrier. Therefore, storage units that can receive write requests in parallel can be used more efficiently in a memory, and the write requests are processed at higher efficiency.

Optionally, in an embodiment, the determining unit 810 is specifically configured to determine, according to a type identifier of the first write request, that the first write request is a log write request. The type identifier is used to indicate that the first write request is a log write request.

Optionally, in an embodiment, the storage unit includes a bank in the memory.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

The embodiment of the present invention further provides a computer program product for data processing, including a computer readable storage medium stored with program code, where an instruction included in the program code is used to execute the method process described in any one of the foregoing method embodiments. An ordinary person skilled in the art may understand that the foregoing storage medium may include any non-transitory machine-readable medium capable of storing program code, such as a USB flash drive, a removable hard disk, a magnetic disk, an optical disc, a random-access memory (RAM), a solid state disk (SSD), or a non-volatile memory.

It should be noted that the embodiments provided in this application are merely examples. A person skilled in the art may clearly know that, for convenience and conciseness of description, in the foregoing embodiments, the embodiments emphasize different aspects, and for a part not described in detail in one embodiment, reference may be made to relevant description of another embodiment. The embodiments of the present invention, claims, and features disclosed in the accompanying drawings may exist independently, or exist in a combination. Features described in a hardware form in the embodiments of the present invention may be executed by software, and vice versa. This is not limited herein.

What is claimed is:

1. A write request processing method, comprising:
determining, by a memory controller that buffers a write request queue comprising to-be-scheduled write requests of transactions and that is in a computer system having memory that is non-volatile memory (NVM) and comprising multiple storage units, that a quantity of write requests in a to-be-scheduled first write request set is less than a quantity of unoccupied storage units in the memory, wherein a first memory barrier exists between a write request in the first write request set and another write request in the write request queue, and the write request in the first write request set is located before the first memory barrier;
determining a second write request set by the memory controller, wherein a write request in the second write request set is a log write request, wherein the write request in the second write request set is located behind the first memory barrier in the write request queue, and wherein a sum of a quantity of write requests in the second write request set and the quantity of write requests in the first write request set is not greater than the quantity of unoccupied storage units in the memory; and sending, by the memory controller, the write request in the first write request set and the write request in the second write request set in parallel to different unoccupied storage units in the memory.

2. The write request processing method according to claim 1, wherein the method further comprises:

determining that a quantity of write requests in a to-be-scheduled third write request set is less than a quantity of unoccupied storage units in the memory, wherein a second memory barrier exists between a write request in the third write request set and another write request in the write request queue, and the write request in the third write request set is located before the second memory barrier;

determining a fourth write request set, wherein a write request in the fourth write request set comprises at least one of a commit write request or an abort write request, wherein the write request in the fourth write request set is located behind the second memory barrier in the write request queue, wherein the write request in the fourth write request set is separated from the write request in the third write request set by the second memory barrier, wherein each write request in the fourth write request set is different from each write request in the third write request set in terms of transactions, and wherein a sum of a quantity of write requests in the fourth write request set and the quantity of write requests in the third write request set is not greater than the quantity of unoccupied storage units in the memory; and sending the write request in the third write request set and the write request in the fourth write request set in parallel to different unoccupied storage units in the memory.

3. The write request processing method according to claim 2, wherein the determining the fourth write request set comprises:

determining the fourth write request set according to a transaction identifier carried in a write request in the write request queue, wherein the transaction identifier is used to indicate a transaction to which the write request belongs.

4. The write request processing method according to claim 1, wherein the method further comprises:

determining that a quantity of write requests in a to-be-scheduled fifth write request set is less than a quantity of unoccupied storage units in the memory, wherein a third memory barrier exists between a write request in the fifth write request set and another write request in the write request queue, wherein the write request in the fifth write request set is located before the third memory barrier, and wherein no write request in the fifth write request set is a log write request;

determining a sixth write request set, wherein a write request in the sixth write request set is one of a commit write request or an abort write request, wherein the write request in the sixth write request set is located behind the third memory barrier in the write request queue, wherein the write request in the sixth write request set is separated from the write request in the fifth write request set by the third memory barrier, and wherein a sum of a quantity of write requests in the sixth write request set and the quantity of write requests in the fifth write request set is not greater than the quantity of unoccupied storage units in the memory; and sending the write request in the fifth write request set and the write request in the sixth write request set in parallel to different unoccupied storage units in the memory.

5. The write request processing method according to claim 1, wherein the determining the second write request set comprises:

determining a first storage unit set from the unoccupied storage units in the memory, wherein a storage unit in the first storage unit set is configured to receive a write request other than the write request in the first write request set; and selecting, from write requests that are located behind the first memory barrier in the write request queue, a log write request that is to be sent to the storage unit in the first storage unit set, wherein the selected log write request forms the second write request set.

6. The write request processing method according to claim 1, wherein the storage unit comprises a bank in the memory.

7. A computer system, comprising:

a memory; and a memory controller coupled to the memory, wherein the memory is a non-volatile memory (NVM) and comprises multiple storage units, the memory controller buffers a write request queue, wherein the write request queue comprises to-be-scheduled write requests of transactions, and wherein the memory controller is configured to:

determine that a quantity of write requests in a to-be-scheduled first write request set is less than a quantity of unoccupied storage units in the memory, wherein a first memory barrier exists between a write request in the first write request set and another write request in the write request queue, and the write request in the first write request set is located before the first memory barrier, and wherein the write request queue is buffered in the memory controller;

determine a second write request set, wherein a write request in the second write request set is a log write request, the write request in the second write request set is located behind the first memory barrier in the write request queue, and a sum of a quantity of write requests in the second write request set and the quantity of write requests in the first write request set is not greater than the quantity of unoccupied storage units in the memory; and send the write request in the first write request set and the write request in the second write request set in parallel to different unoccupied storage units in the memory.

8. The computer system according to the claim 7, wherein the memory controller is further configured to:

determine that a quantity of write requests in a to-be-scheduled third write request set is less than a quantity of unoccupied storage units in the memory, wherein a second memory barrier exists between a write request in the third write request set and another write request in the write request queue, and the write request in the third write request set is located before the second memory barrier;

determine a fourth write request set, wherein a write request in the fourth write request set comprises a commit write request or an abort write request, the write request in the fourth write request set is located behind the second memory barrier in the write request queue, the write request in the fourth write request set is separated from the write request in the third write request set by the second memory barrier, each write request in the fourth write request set is different from each write request in the third write request set in terms of transactions, and a sum of a quantity of write requests in the fourth write request set and the quantity of write requests in the third write request set is not greater than the quantity of unoccupied storage units in the memory; and send the write request in the third write request set and the write request in the fourth write request set in parallel to different unoccupied storage units in the memory.

9. The computer system according to the claim 8, wherein in the step of the determining a fourth write request set, the memory controller is configured to:

determine the fourth write request set according to a transaction identifier carried in a write request in the write request queue, wherein the transaction identifier is used to indicate a transaction to which the write request belongs.

10. The computer system according to the claim 7, wherein the memory controller is further configured to:

determine that a quantity of write requests in a to-be-scheduled fifth write request set is less than a quantity of unoccupied storage units in the memory, wherein a third memory barrier exists between a write request in the fifth write request set and another write request in the write request queue, the write request in the fifth write request set is located before the third memory barrier, and no write request in the fifth write request set is a log write request;

determine a sixth write request set, wherein a write request in the sixth write request set is a commit write request or an abort write request, the write request in the sixth write request set is located behind the third memory barrier in the write request queue, the write request in the sixth write request set is separated from the write request in the fifth write request set by the third memory barrier, and a sum of a quantity of write requests in the sixth write request set and the quantity of write requests in the fifth write request set is not greater than the quantity of unoccupied storage units in the memory; and send the write request in the fifth write request set and the write request in the sixth write request set in parallel to different unoccupied storage units in the memory.

11. The computer system according to the claim 7, wherein the memory controller is configured to:

determine a first storage unit set from the unoccupied storage units in the memory, wherein a storage unit in the first storage unit set is configured to receive a write request other than the write request in the first write request set; and select, from write requests that are located behind the first memory barrier in the write request queue, a log write request that is to be sent to the storage unit in the first storage unit set, wherein the selected log write request forms the second write request set.

12. The computer system according to the claim 7, wherein the storage unit comprises a bank in the memory.

13. A write request processing method, comprising:

determining, by a memory controller that buffers a write request queue comprising to-be-scheduled write requests of transactions and that is in a computer system having a memory that is a non-volatile memory (NVM) and that comprises multiple storage units, that a first write request in the write request queue is a log write request, wherein the first write request is located behind a second write request in the write request queue, and the first write request is separated from the second write request by a memory barrier; and sending the first write request and the second write request in parallel to different unoccupied storage units in the memory.

14. The write request processing method according to claim 13, wherein the determining that a first write request in the write request queue is a log write request comprises:

determining, according to a type identifier in the first write request, that the first write request is a log write request, wherein the type identifier is used to indicate that the first write request is a log write request.

15. The write request processing method according to claim 13, wherein the storage unit comprises a bank in the memory.

* * * * *